US007958613B2

(12) United States Patent
Hubbard

(10) Patent No.: US 7,958,613 B2
(45) Date of Patent: Jun. 14, 2011

(54) COUPLING FOR A CLAMP

(76) Inventor: Michael Hubbard, Houston, TX (US)

(*) Notice: Subject to any disclaimer, the term of this patent is extended or adjusted under 35 U.S.C. 154(b) by 251 days.

(21) Appl. No.: 12/166,080

(22) Filed: Jul. 1, 2008

(65) Prior Publication Data

US 2008/0256775 A1 Oct. 23, 2008

Related U.S. Application Data

(62) Division of application No. 11/170,506, filed on Jun. 29, 2005, now Pat. No. 7,398,966.

(51) Int. Cl.
*B23P 11/00* (2006.01)
*B25B 1/02* (2006.01)

(52) U.S. Cl. ........... 29/428; 29/426.1; 29/401.1; 29/469

(58) Field of Classification Search .................. 269/3, 6, 269/88, 155; 403/293, 294, 306, 310, 312, 403/344; 29/401.1, 426.1, 469, 428
See application file for complete search history.

(56) References Cited

U.S. PATENT DOCUMENTS 979,305 A * 12/1910 Hunt ................................ 269/9
1,241,215 A * 9/1917 Hoffman ....................... 269/149
1,354,378 A * 9/1920 Carpenter ..................... 269/149
1,484,794 A 2/1924 Moses
1,583,611 A 5/1926 Seely
2,669,958 A * 2/1954 Sweeney ......................... 269/45
3,033,559 A * 5/1962 Lindholm ..................... 269/140
3,172,158 A * 3/1965 Herman et al. ................. 425/12
3,933,346 A 1/1976 Carver
4,042,264 A 8/1977 Shumer
4,607,829 A 8/1986 Suska
4,921,234 A * 5/1990 Peterson ....................... 269/147
4,926,722 A 5/1990 Sorensen et al.
5,005,449 A 4/1991 Sorensen et al.
5,009,134 A 4/1991 Sorensen et al.
5,170,682 A 12/1992 Sorensen et al.
5,222,420 A 6/1993 Sorensen et al.
5,593,147 A * 1/1997 Read ............................ 269/170
5,746,610 A 5/1998 Shiu
5,980,149 A 11/1999 Colclough et al.
6,089,556 A * 7/2000 Whiteford ..................... 269/149
6,386,530 B1 5/2002 Marks
6,412,767 B1 * 7/2002 Beckmann et al. ........... 269/166
6,530,565 B1 3/2003 Simpson
6,554,264 B1 * 4/2003 Alford .......................... 269/147
D488,043 S 4/2004 Ben-Gigi
6,957,808 B2 * 10/2005 Varzino et al. .................. 269/95
7,114,715 B1 10/2006 Kirk
(Continued)

FOREIGN PATENT DOCUMENTS

DE 32 09 984 5/1983
(Continued)

*Primary Examiner* — Essama Omgba
(74) *Attorney, Agent, or Firm* — Patterson & Sheridan, L.L.P.

(57) ABSTRACT

A method and an apparatus for use in coupling a pair of bar clamps. In one aspect, a coupling member for connecting a first clamp to a second clamp is provided. The coupling member includes a first member and a second member having an end pivotally attached to the first member. The coupling member further includes a connection member for attaching an end of each clamp to the coupling member. In another aspect, a connection member for coupling a pair of bar clamps is provided. In another aspect, a method of connecting a first bar clamp to a second bar clamp is provided.

5 Claims, 2 Drawing Sheets

U.S. PATENT DOCUMENTS

| | | | | |
|---|---|---|---|---|
| 7,159,858 | B2 * | 1/2007 | Ben-Gigi | 269/6 |
| 7,322,571 | B2 * | 1/2008 | Springer | 269/6 |
| 7,396,004 | B2 * | 7/2008 | Kern | 269/6 |
| 7,398,966 | B2 * | 7/2008 | Hubbard | 269/88 |
| 7,441,761 | B2 * | 10/2008 | Hughes | 269/147 |
| 7,484,310 | B2 * | 2/2009 | Jaffers et al. | 33/613 |
| 7,546,691 | B2 * | 6/2009 | Mackey | 33/613 |
| D607,706 | S * | 1/2010 | Jastrow | D8/72 |
| 2003/0080485 | A1 | 5/2003 | Lo | |
| 2003/0234479 | A1 | 12/2003 | Brass et al. | |
| 2004/0040127 | A1 | 3/2004 | Hellkamp | |
| 2004/0140602 | A1 | 7/2004 | Gerritsen et al. | |
| 2004/0195746 | A1 | 10/2004 | Marks | |
| 2007/0090580 | A1 * | 4/2007 | Fratianne | 269/6 |

FOREIGN PATENT DOCUMENTS

| | | |
|---|---|---|
| DE | 89 03 875 | 12/1989 |

* cited by examiner

COUPLING FOR A CLAMP

CROSS-REFERENCE TO RELATED APPLICATIONS

This application is a divisional of U.S. patent application Ser. No. 11/170,506, filed Jun. 29, 2005, now U.S. Pat. No. 7,398,966, which is herein incorporated by reference.

BACKGROUND OF THE INVENTION

1. Field of the Invention

Embodiments of the present invention generally relate to clamps. More particularly, the invention relates to bar clamps. Still more particularly, the invention relates to a coupling configured to connect a pair of bar clamps.

2. Description of the Related Art

Traditional bar clamps are well known in the tool industry for temporarily clamping two workpieces together in order to perform an operation on one or both of the workpieces such as a gluing operation. In recent years, a quick action bar clamp has been introduced to the tool industry. The quick action bar clamp generally includes several clamp components such as a fixed jaw, a slide bar, and a movable jaw. The moveable jaw includes a trigger handle grip assembly for releasably engaging the slide bar to allow the movable jaw to easily move on the slide bar relative to the fixed jaw.

Typically, the components of the quick action bar clamp are sold in a set rather than being sold separately. For example, most quick action bar clamps are sold in varying standard bar lengths, with the clamp components attached. The quick action bar clamps are generally marketed by the size of the workpiece, such as a clamp capable of clamping a 6", 12", 18", 24" 30" or 36" size workpiece. Among other things, one reason the clamp components are not sold separately from the slide bar is to prevent the users from purchasing one set of clamp members for use with varying slide bar lengths and/or from purchasing replacement clamp members and slide bars.

The problem associated with the standard quick action bar clamp is the limited range of clamping capability for each individual bar clamp. For instance, a user must purchase a 12" bar clamp for a workpiece that is 12" or less and then the user must purchase another bar clamp for workpiece that is longer than 12". Thus, the user is required to have an individual bar clamp for each different length of workpiece. Another problem associated with the standard quick action bar clamp occurs when the workpiece is an odd length, such as 45" long. In this instance, the user must locate a nonstandard size quick action bar clamp which may not be readily available in a local hardware store.

A need therefore exists for a method and an apparatus capable of utilizing standard quick action bar clamps for clamping a variety of different length workpieces. Further, there is a need for a method and an apparatus capable of utilizing standard quick action bar clamps for clamping an odd size workpiece.

SUMMARY OF THE INVENTION

The present invention generally relates to a method and an apparatus for use in coupling a pair of bar clamps. In one aspect, a coupling member for connecting a first clamp to a second clamp is provided. The coupling member includes a first member and a second member having an end pivotally attached to the first member. The coupling member further includes a connection member for attaching an end of each clamp to the coupling member.

In another aspect, a connection member for coupling a pair of bar clamps is provided. The connection member includes a body movable between an open position and a closed position. The connection member further includes an attachment member on the body for connecting an end of each bar clamp to the connection member. Additionally, the connection member includes a lock member for selectively locking the body in the closed position.

In another aspect, a method of connecting a first bar clamp to a second bar clamp is provided. Each bar clamp includes a fixed jaw attached to a slide bar and a selectively movable jaw releasably attached to the slide bar. The method includes reversing the orientation of the moveable jaw relative to the fixed jaw on each bar clamp. The method further includes positioning an end of the first bar clamp adjacent an end of a coupling member and positioning an end of the second bar clamp adjacent another end of the coupling member. Additionally, the method includes attaching the end of each bar clamp to the coupling member.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
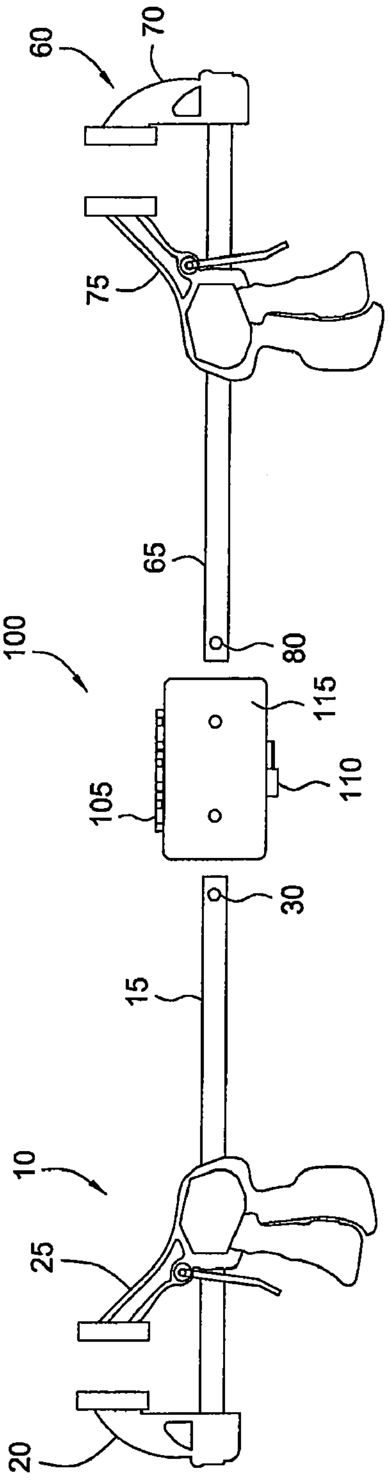
FIG. 1 is a perspective view illustrating a coupling member of the present invention with a first bar clamp and a second bar clamp.

The present invention is generally directed to a coupling for quick action bar clamps. Various terms as used herein are defined below. To the extent a term used in a claim is not defined below, it should be given the broadest definition persons in the pertinent art have given that term, as reflected in printed publications and issued patents. In the description that follows, like parts are marked throughout the specification and drawings with the same reference numerals. The drawings may be, but are not necessarily, to scale and the proportions of certain parts have been exaggerated to better illustrate details and features described below. One of normal skill in the art of clamps will appreciate that the various embodiments of the invention can and may be used in all types of clamps.

FIG. 1 is a view illustrating a coupling member 100 of the present invention with a first bar clamp 10 and a second bar clamp 60. Generally, the coupling member 100 is used to couple or connect the first bar clamp 10 to the second bar clamp 60 to increase the capability of the bar clamps 10, 60 to handle any number of different workpiece lengths. For ease of explanation, the invention will be described generally in relation to a standard quick bar clamp. It is to be understood, however, that the invention may be employed in any number of bar clamps without departing from principles of the present invention.

Figure 3:
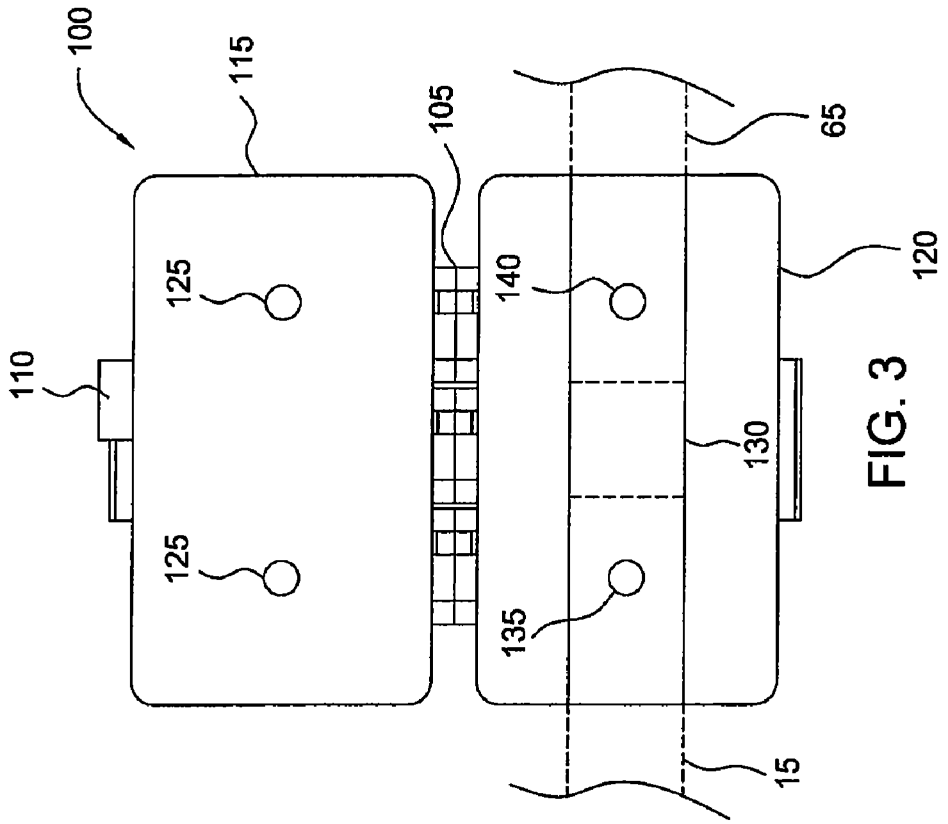
FIG. 3 is a view illustrating the coupling member in an open position.
Figure 4:
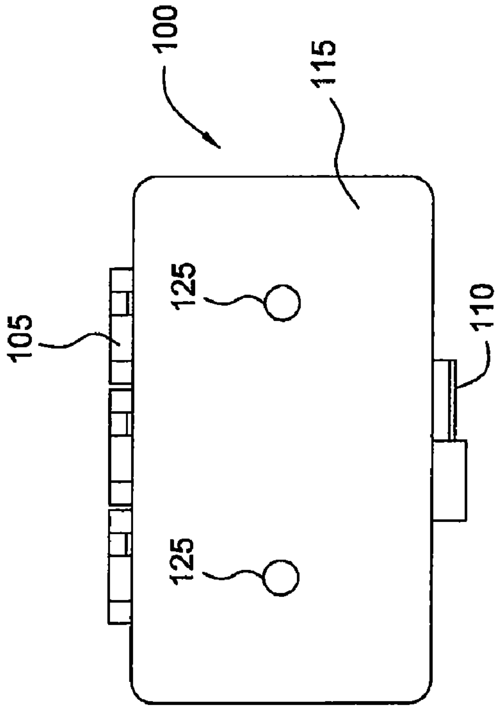
FIG. 4 is a view illustrating the coupling member in a closed position.

As illustrated in FIG. 3, the coupling member 100 is generally made from a first member 115 and a second member 120. One side of the first member 115 is connected to the second member 120 by a hinge member 105 to allow the coupling member 100 to move between an open position as shown in FIG. 3 and a closed position as shown in FIG. 4. The coupling member 100 also includes a lock member 110 to secure the first member 115 to the second member 120 when the coupling member is in the closed position. The components of the coupling member 100 will be described in greater detail below.

Referring back to FIG. 1, the bar clamp 10, 60 typically includes several standard components. For instance, the bar clamp 10, 60 includes a fixed jaw 20, 70 operatively mounted to a slide bar 15, 65. The fixed jaw 20, 70 is capable of holding one portion of a workpiece (not shown). The bar clamp 10, 60 also includes a selectively movable jaw 25, 75 that is capable of moving along the length of the slide bar 15, 65. Further, the movable jaw 25, 75 is capable of holding another portion of the workpiece. The movable jaw 25, 75 moves relative to the fixed jaw 20, 70 to accommodate the length of the workpiece. Typically, the moveable jaw 25, 75 includes a trigger handle grip assembly for releasably engaging the slide bar 15, 65 to allow the movable jaw 25, 75 to easily move on the slide bar 15, 65.

The bar clamp 10, 60 typically includes a stop 30, 80 at an end of the slide bar 15, 65 to limit the travel of the movable jaw 25, 75. In the embodiment shown, the stop 30, 80 is a pin member, such as a metal roll pin or a rubber grommet. In another embodiment, the stop 30, 80 may comprise a hole or any other means capable of limiting the travel of the movable jaw 25, 75 on the slide bar 15, 65.

Figure 2:
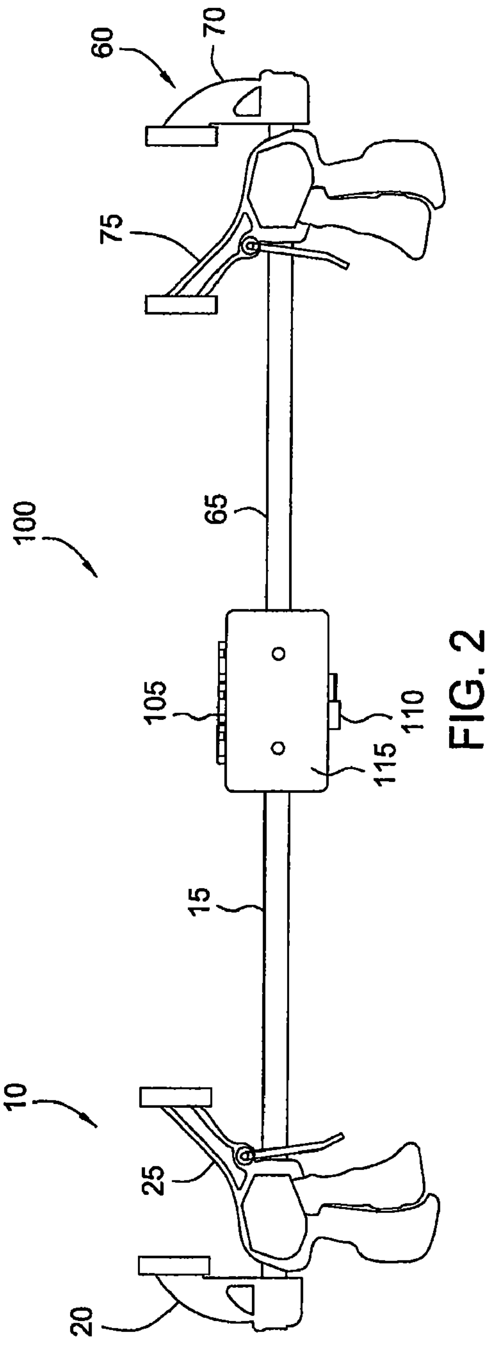
FIG. 2 is a perspective view illustrating the coupling member connecting the first bar clamp to the second bar clamp.

FIG. 2 is a view illustrating the coupling member 100 connecting the first bar clamp 10 to the second bar clamp 60. In comparing FIG. 2 to FIG. 1, it can be seen that the orientation of the movable jaw 25, 75 has been reversed or repositioned relative to the fixed jaw 20, 70. The repositioning of the movable jaw 25, 75 can be done by removing or disengaging the stop 30, 80 at an end of the slide bar 15, 65 and then sliding the movable jaw 25, 75 off the of the slide bar 15, 65, repositioning the movable jaw 25, 75 and subsequently sliding the movable jaw 25, 75 back on to the slide bar 15, 65 in the orientation shown in FIG. 2. Once the movable jaw 25, 75 is repositioned, the coupling 100 is moved from the closed position to the open position. Next, the end of the slide bar 15 is positioned adjacent an end of the coupling member 100 and the end of slide bar 65 is positioned adjacent another end of the coupling member 100 and subsequently the end of each slide bar 15, 65 is secured in the coupling member 100. Thereafter, the coupling member 100 is moved from the open position to the closed position and secured in the closed position by the lock member 110. The movable jaw 25, 75 is then slideable along the slide bar 15, 65 to accommodate various lengths of workpieces.

In the embodiment shown in FIG. 2, the movable jaws 25, 75 are utilized to accommodate the length of the workpiece. It is to be understood, however, that the invention is not limited to the embodiment shown, rather it is conceivable that only one movable jaw may be used in conjunction with at least one fixed jaw to accommodate the workpiece without departing from principles of the present invention.

FIG. 3 is a view illustrating the coupling member 100 in the open position. As shown, the coupling member 100 comprises the first member 115 and the second member 120. The first member 115 is operatively attached to the second member 115 by the hinge member 105 and the first member 115 is attachable to the second member by the lock member 110 when the coupling member 100 is in the closed position. It should be noted that the hinge member and the lock member are shown generally and any number of hinges and locks may be used with the coupling member 100 without departing from principles of the present invention.

The second member 120 is typically made from a durable material, such as a plastic, a composite or a metal material. The second member 120 includes a continuous shaped groove 130 formed on a surface thereof. The groove 130 is used to receive the slide bar 15 and the slide bar 65. In another embodiment, a metal or a plastic insert (not shown) may be placed in the groove 130 to enhance the durability of the coupling member 100.

As shown in FIG. 3, the second member 120 includes a first hole 135 and a second hole 140 formed in the groove 130. Typically, the holes 135, 140 do not extend through the second member 120, but rather the holes 135, 140 are drilled to a predetermined depth. The holes 135, 140 are generally used to secure the slide bar 15, 65 to the coupling member 100. More specifically, in one embodiment, the holes 135, 140 accommodate a pin attached to each slide bar 15, 65, such as a roll pin (stops 30, 80). In another embodiment, the holes 135, 140 may accommodate a removable threaded member (not shown), whereby the threaded member acts as a pin to work in conjunction with a hole at an end of each slide bar 15, 65 to secure the slide bar 15, 65 to the coupling member 100. In yet another embodiment, the second member 120 may have at least one pin member (not shown) formed on a surface thereof in place of the holes 135, 140. The present invention contemplates any combination of pins, holes, threaded members or any other means capable of securing the slide bar 15, 65 to the coupling member 100.

The first member 115 is typically made from a similar durable material as the second member 120, such as a plastic, a composite, or a metal material. The first member 115 includes a plurality of holes 125 that extend through the first member 115. The holes 125 are used to store the stops 30, 80 or extra pins or extra threaded members when the coupling 100 is in operation.

Figure 5:
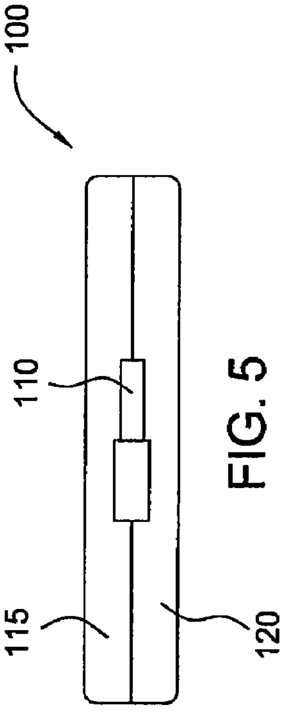
FIG. 5 is another view of the coupling member in the closed position.

FIGS. 4 and 5 are views illustrating the coupling member 100 in the closed position. As clearly shown, the first member 115 is secured to the second member 120 by the lock member 110. Also shown in FIGS. 4 and 5, the overall geometric shape of the coupling member 100 is rectangular. It should be understood, however, that the coupling member 100 may be any geometric shape, such as spherical, without departing from principles of the present invention.

While the foregoing is directed to embodiments of the present invention, other and further embodiments of the invention may be devised without departing from the basic scope thereof, and the scope thereof is determined by the claims that follow.

The invention claimed is:

1. A method of connecting a first bar clamp to a second bar clamp, each bar clamp includes a fixed jaw attached to a slide bar and a selectively movable jaw releasably attached to the slide bar, the method comprising:

reversing an orientation of the moveable jaw relative to the fixed jaw on each bar clamp;

positioning an end of the first bar clamp adjacent an end of a coupling member and positioning an end of the second bar clamp adjacent another end of the coupling member; and attaching the end of each bar clamp to the coupling member such that the movable jaw on the first bar clamp is on one side of the coupling member and the movable jaw on the second bar clamp is on another side of the coupling member.

2. The method of claim 1, wherein the coupling member is selectively movable between an open position and a closed position.

3. The method of claim 2, further including locking the coupling member in the closed position.

4. The method of claim 1, further including removing a stop member from the end of each slide bar.

5. The method of claim 1, wherein reversing the orientation of the movable jaw relative to the fixed jaw comprises:

sliding the movable jaw off the slide bar;

reorienting the movable jaw relative to the fixed jaw; and sliding the movable jaw back on the slide bar.

* * * * *